(12) United States Patent
Dybro

(10) Patent No.: US 12,369,528 B2
(45) Date of Patent: Jul. 29, 2025

(54) BALING SYSTEM FOR AN AGRICULTURAL SYSTEM

(71) Applicant: CNH Industrial America LLC, New Holland, PA (US)

(72) Inventor: Niels Dybro, Muscatine, IA (US)

(*) Notice: Subject to any disclaimer, the term of this patent is extended or adjusted under 35 U.S.C. 154(b) by 0 days.

(21) Appl. No.: 18/747,881

(22) Filed: Jun. 19, 2024

(65) Prior Publication Data

US 2024/0423135 A1 Dec. 26, 2024

Related U.S. Application Data

(60) Provisional application No. 63/534,226, filed on Aug. 23, 2023, provisional application No. 63/521,993, filed on Jun. 20, 2023.

(51) Int. Cl.
| | | |
|---|---|---|
| A01D 90/08 | (2006.01) | |
| A01F 15/07 | (2006.01) | |
| A01F 15/08 | (2006.01) | |
| A01F 15/10 | (2006.01) | |
| A01F 15/18 | (2006.01) | |

(52) U.S. Cl.
CPC .......... *A01D 90/08* (2013.01); *A01F 15/0715* (2013.01); *A01F 15/0883* (2013.01); *A01F 15/106* (2013.01); *A01F 15/18* (2013.01); *A01F 2015/074* (2013.01); *A01F 2015/183* (2013.01)

(58) Field of Classification Search
CPC . A01D 90/08; A01F 15/0715; A01F 15/0883; A01F 15/106; A01F 15/18; A01F 2015/074; A01F 2015/183
See application file for complete search history.

(56) References Cited

U.S. PATENT DOCUMENTS

| | | |
|---|---|---|
| 3,931,702 A | 1/1976 | Soteropulos et al. |
| 5,479,767 A | 1/1996 | McClure et al. |

(Continued)

OTHER PUBLICATIONS

Screen capture(s) from YouTube video clip, CLAAS Variant 385-360 animation / 2010, CLAAS, 2 pages, uploaded on Apr. 20, 2012, Retrieved from Internet: https://www.youtube.com/watch?v=NWIHm41cAyI.
Screen capture(s) from YouTube video clip, 3 pages, last visited on May 1, 2023, Retrieved from Internet: https://www.youtube.com/watch?v=cj-AosHItBQ.
Screen capture(s) from YouTube video clip, Massey Ferguson 2800 Baler Animation, AGCO Corporation, 2 pages, uploaded on Aug. 23, 2010, Retrieved from Internet: https://www.youtube.com/watch?v=zBcUME026w0.

(Continued)

*Primary Examiner* — Lynn E Schwenning
(74) *Attorney, Agent, or Firm* — Rebecca Henkel; Rickard K. DeMille; Peter K. Zacharias

(57) ABSTRACT

An agricultural machine system includes a baling system. The baling system includes a bale forming region. The baling system also includes a tensioning arm rotatably coupled to a frame of the baling system at a pivot. The baling system also includes a first plurality of rollers disposed about the bale forming region. The baling system also includes a second plurality of rollers rotatably coupled to the tensioning arm. The baling system also includes a bale forming belt disposed about the bale forming region. The bale forming belt is engaged with the first plurality of rollers and the second plurality of rollers. A rotational axis of the pivot is positioned below a longitudinal central axis of a fully-formed bale disposed in the bale forming region at an end of a bale forming stage. At least a portion of each roller of the first plurality of rollers is disposed below a height of the fully-formed bale at the end of the bale forming stage.

20 Claims, 10 Drawing Sheets

(56) References Cited

U.S. PATENT DOCUMENTS

| | | |
|---|---|---|
| 6,247,291 B1 | 6/2001 | Underhill |
| 6,536,337 B2 | 3/2003 | Huchet et al. |
| 6,745,680 B2 | 6/2004 | Viaud et al. |
| 7,181,900 B2 | 2/2007 | Hood et al. |
| 7,356,981 B2 | 4/2008 | McClure et al. |
| 8,991,308 B2 | 3/2015 | Roberge et al. |
| 9,603,308 B2 | 3/2017 | Roberge |
| 10,575,469 B2 | 3/2020 | Underhill |
| 11,395,460 B2 | 7/2022 | Smith |
| 2001/0018821 A1 | 9/2001 | Chow |
| 2019/0223384 A1 | 7/2019 | Frey et al. |
| 2020/0367437 A1 | 11/2020 | Hackert et al. |
| 2021/0068348 A1* | 3/2021 | Wigdahl ............. A01F 15/0841 |
| 2021/0282318 A1 | 9/2021 | Cracraft |
| 2021/0360862 A1* | 11/2021 | Goering ................. A01F 15/18 |

OTHER PUBLICATIONS

Screen capture(s) from YouTube video clip, A Look Inside | John Deere 900 Series Round Balers, John Deere, 2 pages, uploaded on Feb. 11, 2015, Retrieved from Internet: https://www.youtube.com/watch?v=vYTcWhOmER4.

Screen capture(s) from YouTube video clip, John Deere | M-Series Variable Chamber Baler, John Deere UK IE, 2 pages, uploaded on Jan. 22, 2018, Retrieved from Internet: https://www.youtube.com/watch?v=W89f8UTNfwk.

Screen capture(s) from YouTube video clip, KRONE VariPack Animation—how the VariPack round baler works, KRONE Agriculture International, 2 pages, uploaded on Jun. 25, 2021, Retrieved from Internet: https://www.youtube.com/watch?v=VK4JXLsBanY.

Screen capture(s) from YouTube video clip, 2 pages, last visited on May 1, 2023, Retrieved from Internet: https://www.youtube.com/watch?v=oRSDvaE97-U.

* cited by examiner

BALING SYSTEM FOR AN AGRICULTURAL SYSTEM

BACKGROUND OF THE INVENTION

The present disclosure relates generally to a baling system of an agricultural machine system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Certain agricultural systems may be used for baling a product into bales. An agricultural machine system may include a baling system that bales a product (e.g., hay, straw, cotton) into a bale, wraps the bale, and subsequently deposits the wrapped bale onto a field. The baling system may include systems for feeding the product into the baling system, wrapping the bale, ejecting the bale from the baling system, and a bale carrier allowing the bale to be dropped at a location designated by the operator.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, an agricultural machine system includes a baling system. The baling system includes a bale forming region. The baling system also includes a tensioning arm rotatably coupled to a frame of the baling system at a pivot. The baling system also includes a first plurality of rollers disposed about the bale forming region. The baling system also includes a second plurality of rollers rotatably coupled to the tensioning arm. The baling system also includes a bale forming belt disposed about the bale forming region. The bale forming belt is engaged with the first plurality of rollers and the second plurality of rollers. A rotational axis of the pivot is positioned below a longitudinal central axis of a fully-formed bale disposed in the bale forming region at an end of a bale forming stage. At least a portion of each roller of the first plurality of rollers is disposed below a height of the fully-formed bale at the end of the bale forming stage.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In agricultural machine systems that include a baling system, the baling system (e.g., portion in which the bale is formed) is frequently tall in height, making it difficult for transporting the baling system past overhead obstacles (e.g., power lines). The baling system in the present disclosure includes features that decrease the overall height of the baling system. For example, the baling system in the present disclosure includes a tensioning arm disposed on a front side of a bale forming region of the baling system. The tensioning arm is coupled to bale forming belt disposed about the bale forming region. The tensioning arm is configured to rotate to enable the bale forming belt to retain the bale as the bale expands in the bale forming region. The baling system also includes a feeding system and a wrapping system disposed on a front side of the bale forming region. The baling system also includes a pendulum arm configured to rotate about a fully-formed bale to eject the bale from the bale forming region via an unwrapping of the bale forming belt from the fully-formed bale. It may be appreciated that the baling system disclosed herein reduces the duration of time (e.g., ejection time) for ejecting a bale from the baling system.

Figure 1:
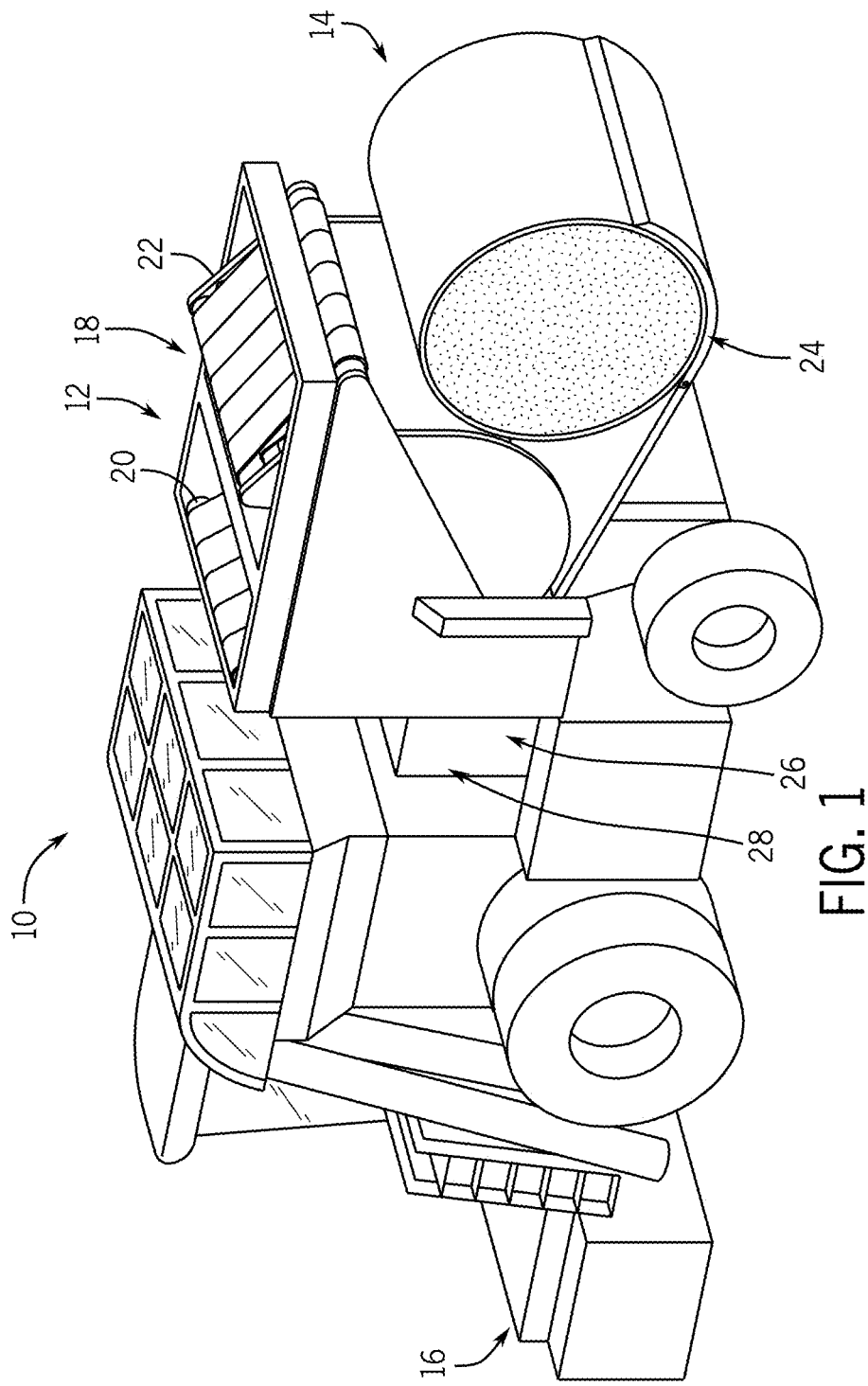
FIG. 1 is a perspective view of an embodiment of an agricultural machine system having a baling system.

FIG. 1 is a perspective view of an embodiment of an agricultural machine system 10 (e.g., vehicle, harvester)

having a baling system 12 (e.g., baler). The agricultural machine system 10 is configured to harvest agricultural product (e.g., cotton) from a field and to form the agricultural product into bales 14 (e.g., agricultural bales 14). For example, the agricultural machine system 10 includes a header 16 having drums configured to harvest the agricultural product from the plants grown in the field. Additionally, the agricultural machine system 10 may include an air-assisted conveying system 18 configured to move the agricultural product from the drums of the header 16 to a baling system 12. The baling system 12 is supported by and/or mounted within or on a chassis of the agricultural machine system 10. As discussed in detail below, the baling system 12 may form the agricultural product into round bales 14. However, in other embodiments, the baling system 12 of the agricultural machine system 10 may form the agricultural product into square bales, polygonal bales, or bales of other suitable shape(s). As described in greater detail below, after forming the agricultural product into a bale, a bale wrapping system of the agricultural machine system 10 (e.g., baling system 12) wraps the bale with a bale wrap to secure the agricultural product within the bale and to generally maintain a shape of the bale.

In the illustrated embodiment, the baling system 12 includes a bale forming region 18 where the bale 14 is formed. The baling system also includes one or more main rollers 20 (e.g., first roller, second roller, third roller, fourth roller, fifth roller, sixth roller, etc.) disposed about the bale forming region 18. The baling system 12 also includes a pendulum arm 22 used for ejection of the bale 14 onto a bale carrier 24. In certain embodiments, the baling system 12 also includes a feeding system 26 configured to feed the agricultural product into the bale forming region 18, and a bale wrapping system 28 configured to wrap fully-formed bales 14.

Figure 2:
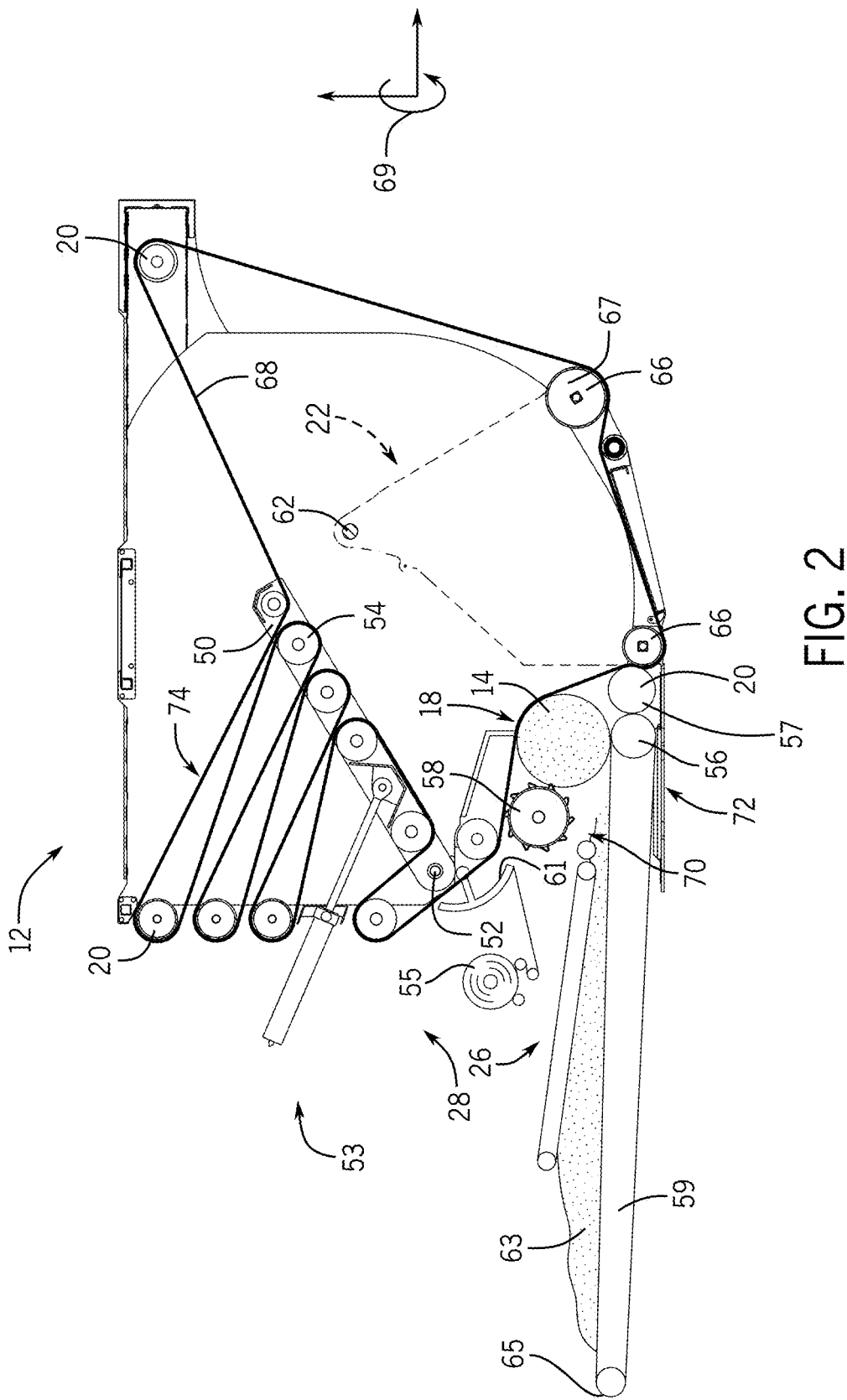
FIG. 2 is a side schematic view of an embodiment of the baling system that may be employed within the agricultural system of FIG. 1, in which a bale is being formed.

FIG. 2 is a side schematic view of an embodiment of the baling system 12 of FIG. 1, in which a bale 14 is being formed. As shown, the baling system 12 includes the bale forming region 18 in which the bale 14 is formed. The baling system also includes a tensioning arm 50 rotatably coupled to a frame of the baling system 12 at a pivot 52. In the illustrated embodiment, the pivot 52 is disposed on a front side 53 of the bale forming region 18, such that the tensioning arm 50 is mounted on the front side 53 of the bale forming region 18. One or more tensioning arm rollers 54 (e.g., first roller, second roller, third roller, etc.) are rotatably coupled to the tensioning arm 50. In the illustrated embodiment, the main rollers 20 are pivotally coupled to a frame of the baling system 12, such that the main rollers 20 do not move with the tensioning arm 50 or the pendulum arm 22. Although the illustrated embodiment shows the baling system 12 having four main rollers disposed in front of the tensioning arm 50, in certain embodiments there may be fewer than four main rollers 20 disposed in front of the tensioning arm 50 (e.g., three main rollers, two main rollers, etc.). Additionally, although the illustrated embodiment shows the tensioning arm 50 as having five tensioning arm rollers 54, in certain embodiments the tensioning arm 50 may have fewer than five tensioning arm rollers 54 (e.g., four tensioning arm rollers, three tensioning arm rollers, etc.).

As shown, the baling system 12 also includes the feeding system 26 and the bale wrapping system 28. The feeding system 26 may include one or more feeding rollers 56 (e.g., first feeding roller, second feeding roller). In addition, the bale wrapping system 28 may include one or more wrapping rollers 58, one or more wrapping material roll(s) 55 and a wrapping mechanism 61 configured to transfer wrapping material (e.g., plastic, cotton, etc.) from the wrapping rollers 58 to the bale 14. The feeding system 26 feeds an agricultural product 63 (e.g., cotton) to the bale forming region 18 via one or more conveyors 59 (e.g., first conveyor, second conveyor). Each conveyor 59 may be rotatably coupled to a conveyor pivot 65, and the conveyors 59 are configured to direct the agricultural product 63 to the feeding rollers 56 while concurrently compressing the product 63 via rotation of the conveyors 59. In the illustrated embodiment, the main rollers 20 include a bottom main roller 57 disposed between the feeding rollers 56 and the pendulum arm 22. As shown, the feeding system 26 and the bale wrapping system 28 are disposed on the front side 53 of the bale forming region 18.

Additionally, the baling system 12 includes the pendulum arm 22 for ejecting a fully-formed bale 14 from the bale forming region 18. The pendulum arm 22 may be coupled to the frame of the baling system 12 by an arm pivot 62. One or more pendulum arm rollers 66 (e.g., first roller, second roller, third roller, etc.) are rotatably coupled to the pivot arm 22. In the illustrated embodiment, the first roller pendulum arm rollers 66 are coupled to or near the first support, and the second and third pendulum arm rollers 66 are coupled to or near the second support. In the illustrated embodiment, a third roller 67 of the pendulum arm rollers 66 is of a larger diameter than the remaining pendulum arm rollers 66. The larger diameter of the third roller 67 allows the fully-formed bale 14 to be cradled when a tailgate of the agricultural machine system 10 is closed (e.g., pendulum arm 22 is in down position). The pendulum arm 22 is discussed in further detail herein. The baling system 12 also includes a bale forming belt 68 disposed about the bale forming region 18, the main rollers 20, the tensioning arm rollers 54, and the pendulum arm rollers 66 of the pendulum arm 22. It is to be understood that the bale forming belt 68 may be one or more bale forming belts 68.

In certain embodiments, the bale forming belt 68 may move opposite the circumferential direction 69 (e.g., clockwise direction) about the main rollers 20, the tensioning arm rollers 54, and the pendulum arm rollers 66 such that the motion of the bale forming belt 68 is imparted on the bale 14 in the bale forming region 18 (e.g., due to friction between the bale 14 and the bale forming belt 68), causing the bale 14 to rotate in the circumferential direction 69 (e.g., counter-clockwise direction). In the illustrated embodiment, the bale 14 forms in the bale forming region 18, defined by the bale forming belt 68, in response to the agricultural product 63 being fed to the bale forming region 18 via the feeding system 26. The formation of the bale 14 in the bale forming region 18 is referred to as the bale forming stage herein.

In the illustrated embodiment, an inlet 70 (e.g., tangential inlet) to the bale forming region 18 from the conveyor belt 59 is disposed on a bottom side 72 of the bale forming region 18 and on the front side 53 of the bale forming region 18 (e.g., lower left). In certain embodiments, the inlet 70 may be disposed on a top side 74 of the bale forming region 18 and on the front side 53 of the bale forming region 18 (e.g., upper left).

Figure 3:
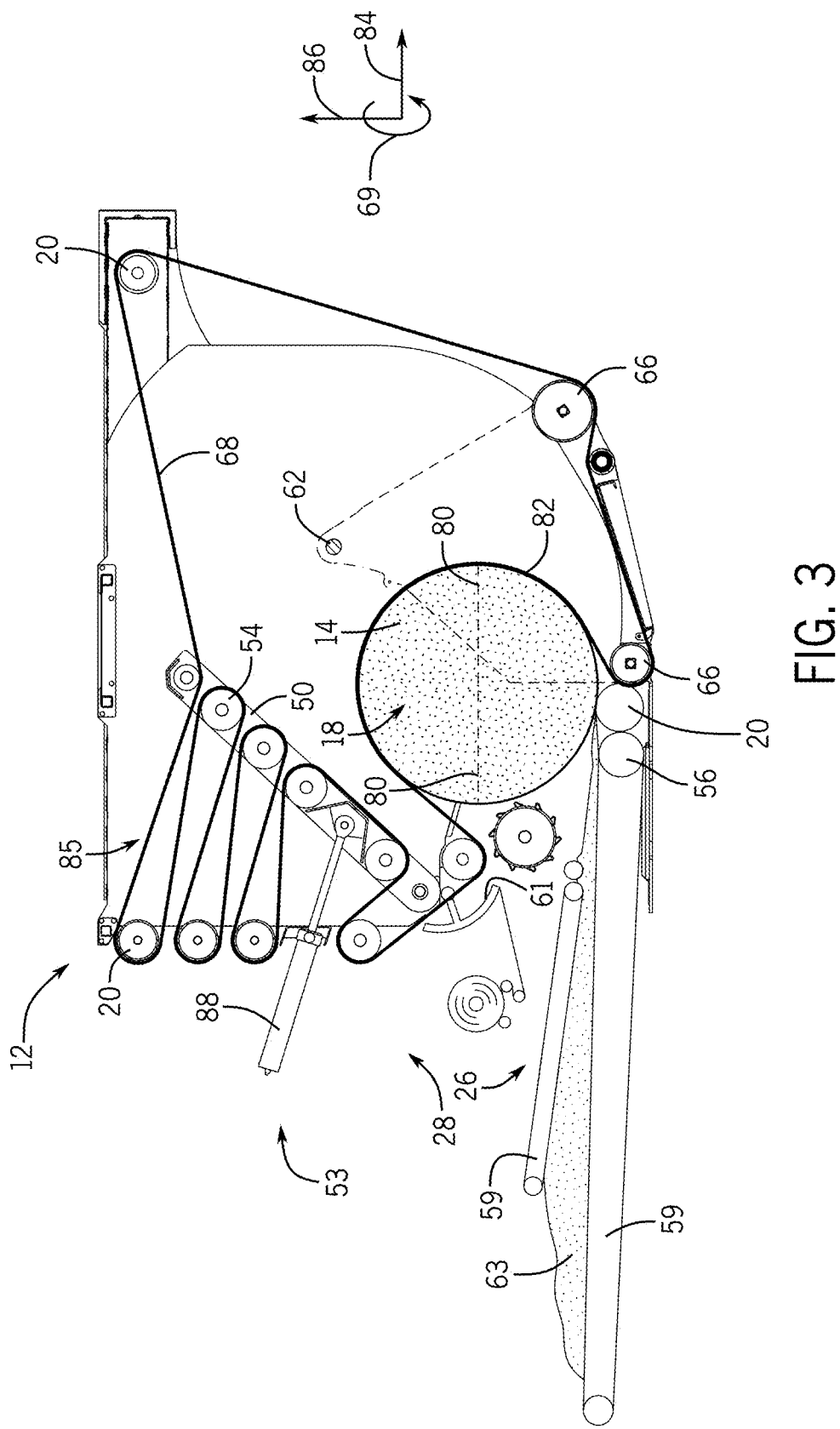
FIG. 3 is a side schematic view of the baling system of FIG. 2, in which the bale is increasing in size.

FIG. 3 is a side schematic view of the baling system 12 of FIG. 2, in which the bale 14 is increasing in size. In the illustrated embodiment, a diameter 80 of the bale 14 has increased relative to the bale in FIG. 2. As shown, a larger proportion of the bale forming belt 68 contacts a perimeter 82 (e.g., circumference) of the bale 14 due to the increase in the diameter 80 of the bale 14. In response to the increase in size of the bale 14, the tensioning arm 50 is configured to rotate in the circumferential direction 69 (e.g., counter-clockwise) from a starting angle at a beginning of a bale forming stage. As the tensioning arm 50 rotates in the circumferential direction 69, the tensioning arm 50 shifts a portion of the bale forming belt 68 distributed in a serpentine portion 85 between the main rollers 20 and 54 upwardly. As the bale 14 increases in size, the tensioning arm 50 maintains tension on the bale forming belt 68 so that the bale 14 is retained in the bale forming region 18.

In certain embodiments, the starting angle of the tensioning arm 50 falls within a span (e.g., window) of angles spanning plus or minus 20 degrees of a 40-degree angle off the longitudinal axis 84. In certain embodiments, the starting angle may depend on a length of the bale forming belt 68. For example, a controller may be configured to increase the starting angle of the tensioning arm 50 over time (e.g., relative to a horizontal orientation) in response to an increase in the length of the bale forming belt 68 due to elongation of the bale forming belt 68 from repeated use. In certain embodiments, one or more actuators 88 (e.g. hydraulically or electrically actuated linear or rotary actuator) may be directly coupled to the tensioning arm 50 and configured to drive the tensioning arm 50 to rotate about the pivot 52. In certain embodiments, the one or more actuators 88 may drive rotation of the tensioning arm 50 without the use of a crank arm or a torque tube (e.g., coupled to the one or more actuators 88 and the tensioning arm 50). In other embodiments, the one or more actuators 88 may be indirectly coupled to the tensioning arm 50. For example, the one or more actuators 88 may be coupled to crank arm(s) coupled to the tensioning arm 50 such that the one or more actuators 88 are vertically oriented. In certain embodiments, the one or more actuators 88 along with the crank arm may drive rotation of the tensioning arm 50. In certain embodiments, a controller may be configured to control the actuators 88 to move the tensioning arm 50 such that an amount of tension in the bale forming belt 68 is regulated to a desired tension (e.g., setpoint tension) during the bale forming stage.

In the illustrated embodiment, in response to an increase in the size of the bale 14 its perimeter 82 increases-requiring a larger portion of the bale forming belt 68 is distributed around the growing bale 14. The larger portion of bale forming belt 68 needed to encompass the bale 14 is yielded by the portion of bale forming belt 68 associated with the serpentine portion 85, causing a rotation of the tensioning arm 50 in the circumferential direction 69 and the distances between the tensioning arm rollers 54 and the main rollers 20 decrease.

In certain embodiments, the feeding system 26 may include a roller configured to contact the bale 14 during the bale forming stage. In certain embodiments, a roller may be coupled to a motor and may be configured to rotate the bale 14 in the circumferential direction 69 such that the agricultural product 63 (e.g., feed, stock) fed to the bale forming region 18 via the feeding system 26 is distributed evenly about the perimeter 82 of the bale 14. In certain embodiments, one or more of the main rollers 20 may be coupled to motors and configured to drive the bale forming belt 68 about the main rollers 20, 54, and 66. In certain embodiments, the bale forming belt 68 may be configured to rotate the bale 14 in the circumferential direction 69 via friction between the perimeter 82 of the bale 14 and the bale forming belt 68. In certain embodiments, the bale forming belt 68 may be configured to rotate the bale 14. In certain embodiments, the rotation of the bale 14 may enable the bale 14 to remove the agricultural product 63 (e.g., feed, stock) from the conveyors 59 via adherence between the agricultural product 63 and the perimeter 82 of the bale 14.

Figure 4:
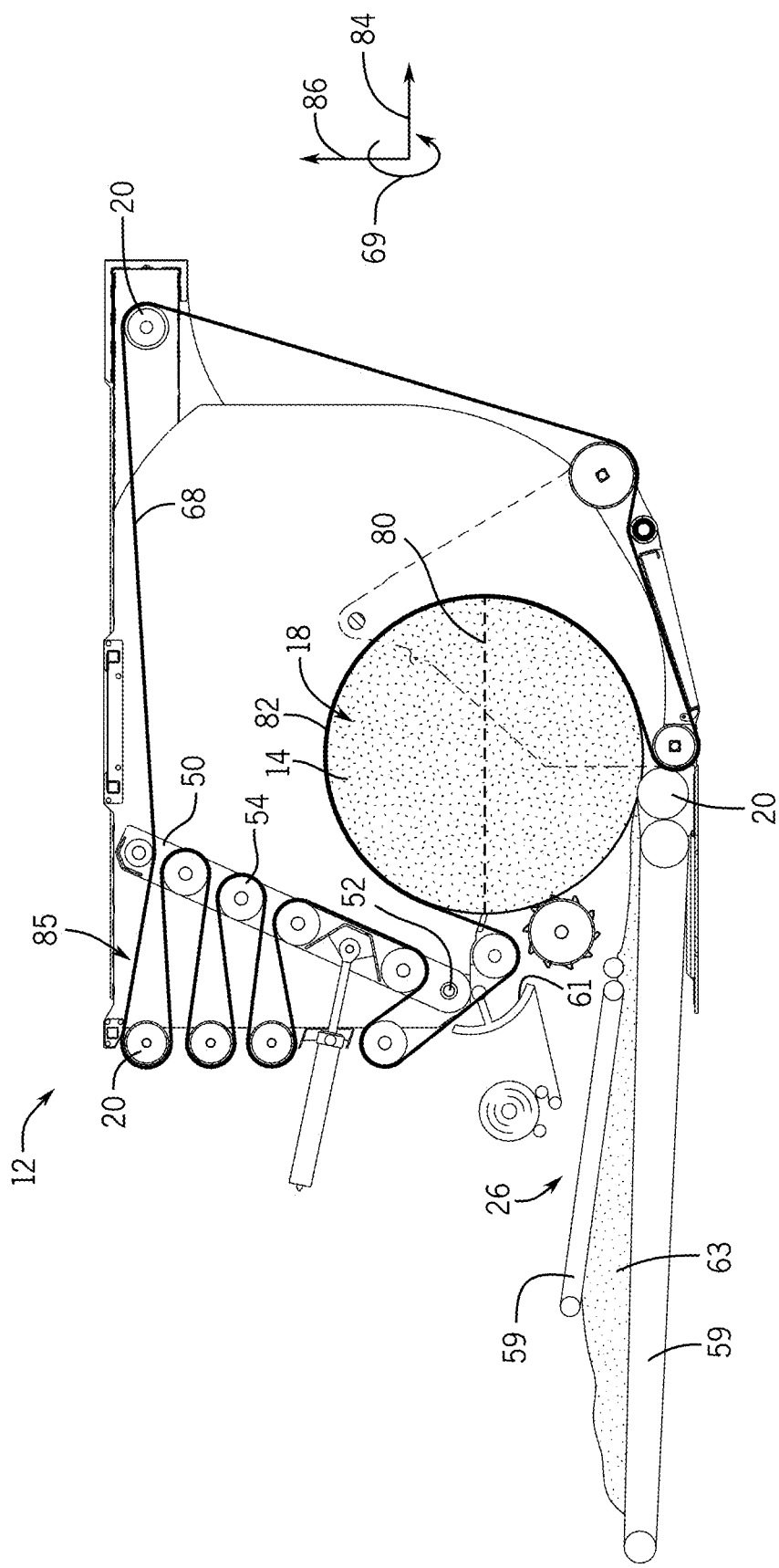
FIG. 4 is a side schematic view of the baling system of FIG. 2, in which the bale is further increasing in size.

FIG. 4 is a side schematic view of the baling system 12 of FIG. 2, in which the bale is further increasing in size. As shown, the bale 14 (e.g., bale diameter 80) has increased in size as more product is fed into the bale forming region 18 via the feeding system 26 and the conveyors 59. As shown, the agricultural product 63 is fed to the bale forming region 18 via the feeding system 26 and along the conveyors 59 at a slightly downward angle relative to the longitudinal axis 84. In certain embodiments, the agricultural product 63 is fed to the bale forming region 18 in a direction that is substantially parallel to the longitudinal axis 84. In response to the increase in size of the bale 14, the tensioning arm 50 rotates about the pivot 52 such that the tensioning arm 50 is oriented at a steeper angle (e.g., closer to the vertical direction 86). As the tensioning arm 50 continues to rotate in the circumferential direction 69, a greater proportion of the bale forming belt 68 is shifted (e.g., redistributed) from the serpentine portion 85 (e.g. serpentine section) of the bale forming belt 68 to the perimeter 82 of the bale 14 as the distance between the main rollers 20 and 54 decreases and the bale diameter 80 increases.

Figure 5:
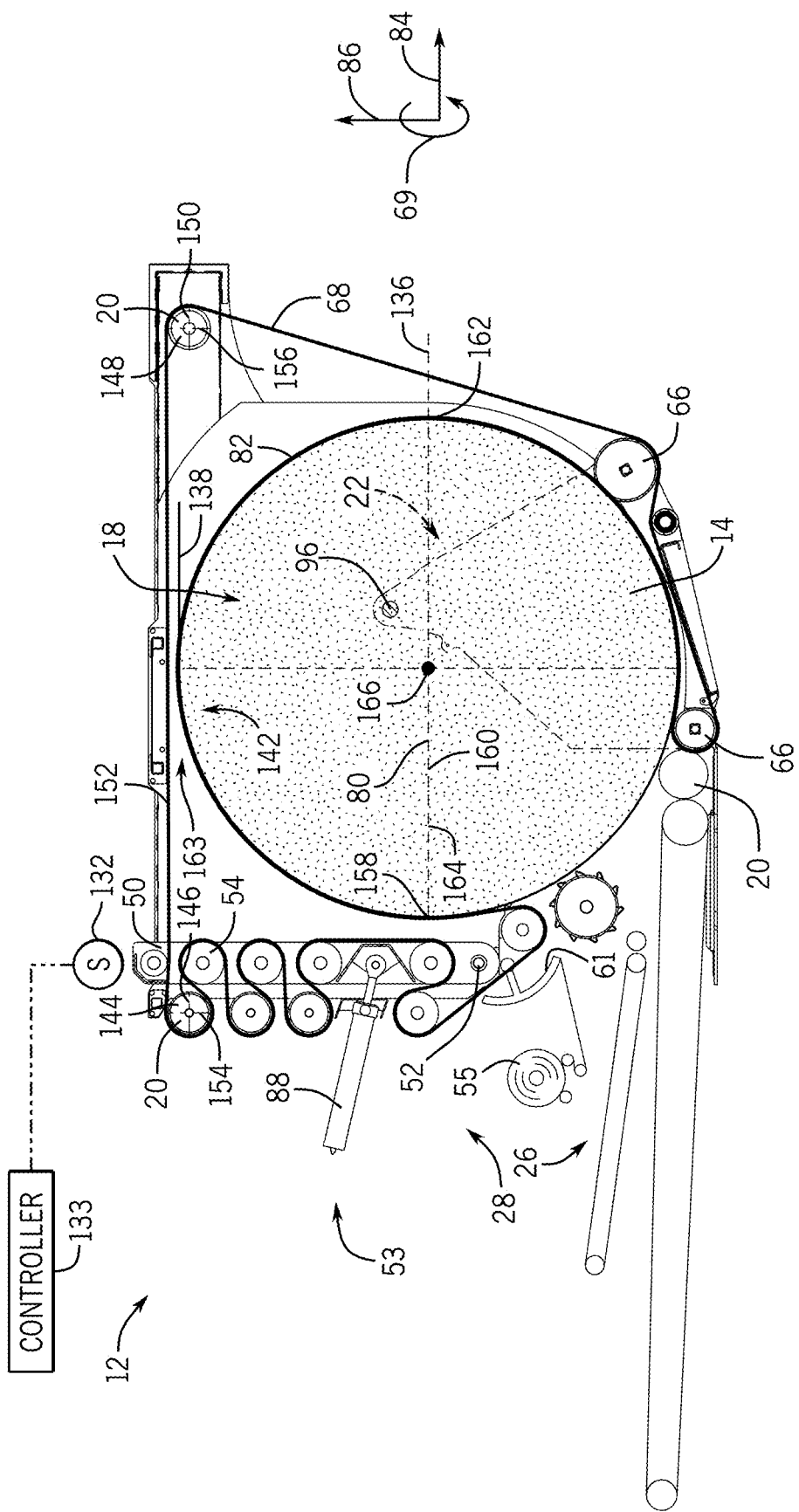
FIG. 5 is a side schematic view of the baling system of FIG. 2, in which the bale is fully formed.

FIG. 5 is a side schematic view of the baling system 12 of FIG. 2, in which the bale 14 is fully formed. In certain embodiments, one or more sensors 132 (e.g., proximity sensors, limit switches, position sensors for tension arm) may be used to detect the diameter 80 of the bale 14 reaching a threshold diameter. In response to the one or more sensors 132 detecting that the threshold diameter has been reached, the one or more sensors 132 may output signal(s) to a controller 133 configured to determine the bale 14 to be fully-formed based on the signal(s). In the illustrated embodiment, the tensioning arm 50 is oriented at an ending angle (e.g., second angle) in response to the bale 14 becoming a fully-formed bale 14. In certain embodiments, the ending angle may fall within a span (e.g., window) of angles. For example, the ending angle of the tensioning arm 50 may span from a 45-degree angle relative to the longitudinal axis 84 to a near-vertical orientation (e.g., substantially along the vertical direction 86). In the illustrated embodiment, the wrapping mechanism 61 is oriented in at initial angle (e.g., bale-forming angle).

In the illustrated embodiment, the pivot 52 is disposed beneath the longitudinal central axis 136 (e.g., diametric axis) of the fully-formed bale 14. In the illustrated embodiment, at least a portion of each roller 20, at least a portion of each tensioning arm rollers 54, the feeding system 26, and at least a portion of the bale wrapping system 28 are disposed below a height 138 of the fully-formed bale 14 at the end of the bale forming stage. In certain embodiments, none of the main rollers 20 and 54 are entirely disposed above the height 138 of the fully-formed bale 14 at the end of the bale forming stage. Because at least a portion of each roller 20, at least a portion of each roller 54, the feeding system 26, and at least a portion of the bale wrapping system 28 are disposed below the height 138 of the fully-formed bale 14, a height of the baling system 12 may be reduced, which may enable the agricultural vehicle 10 to drive under power lines during a baling operation and bale ejection.

In the illustrated embodiment, the bale wrapping system 28 is configured to wrap the fully-formed bale 14 while the fully-formed bale 14 is rotating in the circumferential direction 69 (e.g., counter-clockwise direction), in which a top portion 142 of the fully-formed bale 14 rotates toward the front side 53 of the bale forming region 18. In certain embodiments, wrapping of the fully-formed bale 14 during a wrapping stage may be assisted by gravity. For example, the material (e.g., plastic, cotton) used for wrapping the fully-formed bale 14 by the bale wrapping system 28 may more easily wrap around the fully-formed bale 14 when the fully-formed bale 14 is rotated in the circumferential direction 69 due to the weight of the material as the material is dispensed from the wrapping material roll 55 to the perimeter 82 of the fully-formed bale 14.

In the illustrated embodiment, the pendulum arm 22 is configured to disengage (e.g., remove) a portion of the bale forming belt 68 from the perimeter 82 of the fully-formed bale 14 via a rotation of the pendulum arm 22 in the circumferential direction 69 (e.g., counter-clockwise rotation) about the fully-formed bale 14. Accordingly, the pendulum arm 22 is configured to facilitate ejection of the fully-formed bale 14 from the bale forming region 18. As shown, as the pendulum arm 22 rotates in the circumferential direction 69, the tensioning arm 50 concurrently rotates from the ending angle towards the starting angle. In certain embodiments, the pendulum arm 22 rotates based on movement of actuators coupled to the pendulum arm 22 which cause the pendulum arm 22 to rotate in the circumferential direction 69. The tensioning arm 50 is configured to concurrently rotate clock-wise due to the pressure in the actuators 88 being kept at a sufficiently high level in order to keep the bale forming belt 68 in tension. The tension in maintained by the bale forming belt 68 causes the fully-formed bale 14 to be ejected from the bale forming region 18.

In the illustrated embodiment, the main rollers 20 include a roller 144 partially disposed above (e.g., partially above the height 138 of) the fully-formed bale 14 at a height 146, and in front (e.g., on the front side 53) of the bale forming region 18. Additionally, the main rollers 20 include a roller 148 disposed partially above (e.g., partially above the height 138 of) the fully-formed bale 14 at a height 150, and behind the bale forming region 18. In certain embodiments, the heights 146 and 150 are substantially equal, such that the rollers 144 and 148 are disposed at substantially equal heights, and thereby creating a minimal clearance between bale forming belt 68 surrounding the fully formed bale 14 and returning portions of the bale forming belt 68 to reduce the potential for chafing situations between two portions of bale forming belt 68.

In the illustrated embodiment, a section 152 of the bale forming belt 68 disposed between the rollers 144 and 148 includes a straight path of the bale forming belt 68. As shown, the section 152 of the bale forming belt 68 is disposed above the fully-formed bale 14. As shown, the main rollers 20 and 54 and the tensioning arm 50 are configured to be disposed below the section 152 of the bale forming belt 68 at least during the bale forming stage. In the illustrated embodiment, an end 154 of the section 152 of the bale forming belt 68 is positioned longitudinally outward from a front endpoint 158 of a longitudinal extent 160 (e.g., diameter 80) of the fully-formed bale 14. Additionally, an end 156 of the section 152 is positioned longitudinally outward from a back endpoint 162 of the longitudinal extent 160 (e.g., diameter 80).

Additionally, a center 166 of the fully-formed bale 14 is located below a pivot center 96 of the pendulum 22 with respect to the vertical direction 86 and in front of the pivot center 96 of the pendulum 22 with respect to the longitudinal axis 84. In certain embodiments, the offset of the center 166 from the pivot center 96 with respect to the vertical direction 86 is equal to the offset of the center 166 from the pivot center 96 with respect to the longitudinal axis 84.

In the illustrated embodiment, the section 152 of the bale forming belt 68 and the perimeter 82 of the fully-formed bale 14 (e.g., engaged by the bale forming belt 68) are separated by a gap 163 (e.g., with respect to the vertical axis 86). In certain embodiments, the section 152 of the bale forming belt 68 may be located directly above the perimeter 82 of the fully-formed bale 14. In certain embodiments, a width of the gap 163 may be less than a percentage of the radius 164 of the fully-formed bale 14. For example, the width of the gap 163 may be less than 20 percent, less than 10 percent, or less than 5 percent of the radius 164. In certain embodiments, the gap 163 may range from a near-zero width to a width corresponding to a larger of the diameters of the rollers 144 and 148. The positioning of the rollers 144 and 148 may reduce a height of the bailing system 12, which may enable the agricultural vehicle 10 to drive under power lines during a baling operation.

In the illustrated embodiment, the bale forming belt 68 is disposed about the first roller of the pendulum arm rollers 66, and fed between the second and third rollers of the pendulum arm rollers 66. As shown, the bale forming belt 68 is disposed (e.g., wrapped) above the second roller and disposed below the third while the pendulum arm is oriented in a downward position (e.g., during the bale forming stage).

Figure 6:
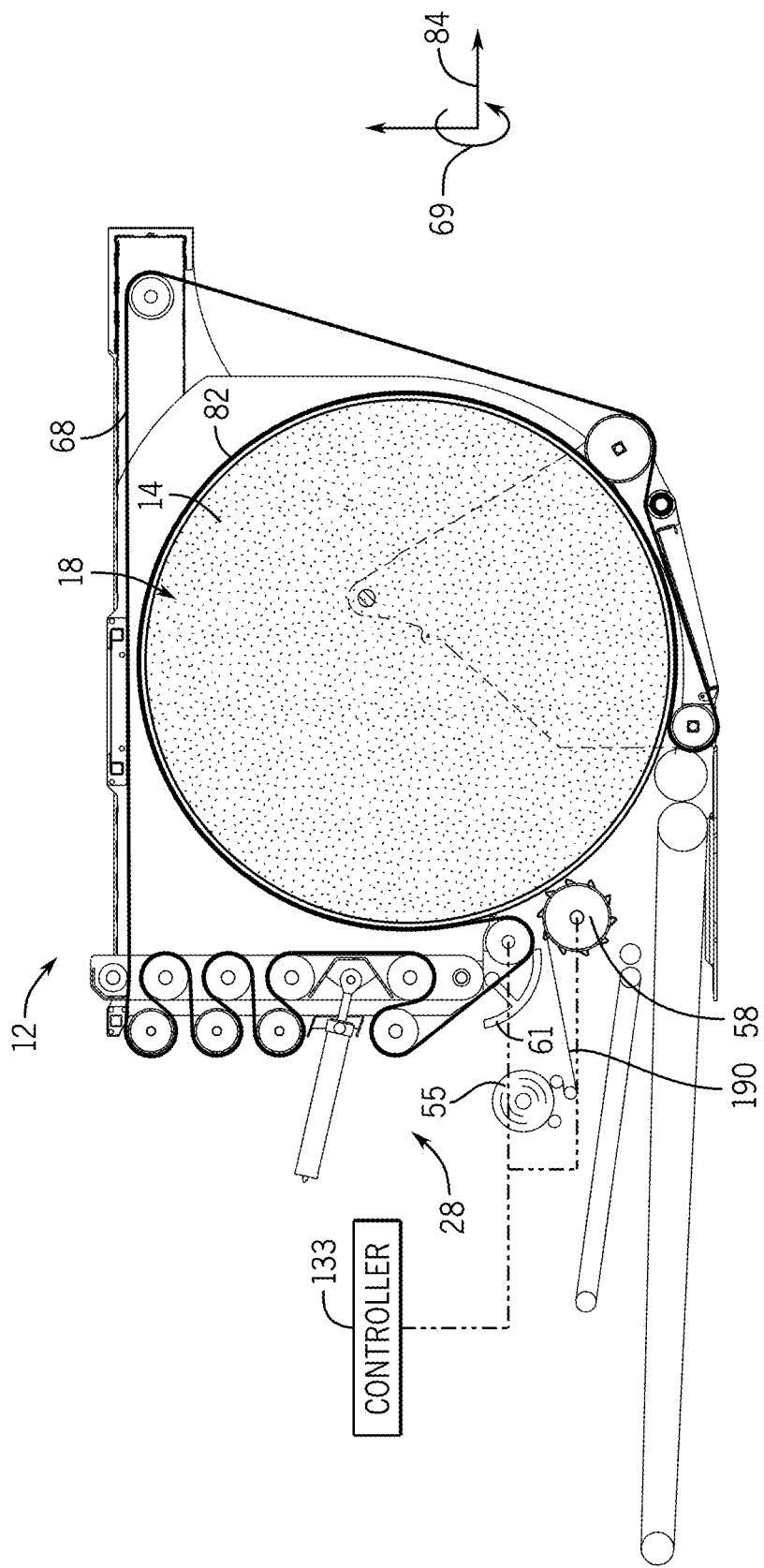
FIG. 6 is a side schematic view of the baling system of FIG. 2, in which the bale is wrapped.

FIG. 6 is a side schematic view of the baling system 12 of FIG. 2, in which the bale 14 is wrapped. In the illustrated embodiment, the wrapping mechanism 61 is rotated toward the fully-formed bale 14 and a bale starter roller 58. The bale starter roller 58 is configured to rotate opposite the circumferential direction 69 while contacting a wrapping material 190 dispensed from the wrapping material roll 55, thereby transferring the wrapping material 190 from the wrapping material roll 55 to the perimeter 82 of the fully-formed bale 14. As shown, the bale starter roller 58 includes one or more pointed protrusions (e.g., spikes) configured to assist in the transfer the material to the perimeter 82 of the fully-formed bale 14. In certain embodiments, more than one bale starter roller 58 may be used for transferring the material from the wrapping material roll 55 to the perimeter 82 of the fully-formed bale 14.

In certain embodiments, the fully-formed bale 14 is rotated (e.g., via the bale forming belt 68) in the circumferential direction 69, such that the wrapping material 190 is distributed (e.g., wrapped) about the perimeter 82 of the fully-formed bale 14. In certain embodiments, the controller 133 may be configured to control the wrapping mechanism 61 and/or the motors that drive the rollers 58 to activate for a certain duration of time and/or until the fully-formed bale 14 is wrapped with a certain number of layers of the wrapping material 190.

In certain embodiments, the wrapping material rolls 55 may be stored vertically in a hopper if the one or more actuators 88 are vertically oriented and/or coupled to crank arm(s). The wrapping mechanism 61 may be configured to remove material from a bottom wrapping roll of the wrapping material rolls 55. In certain embodiments, in response to the bottom wrapping roll becoming fully depleted of material, the wrapping material rolls 55 shift downwardly in the hopper, and the wrapping mechanism 61 may be fed material from the next wrapping material roll 55.

Figure 7:
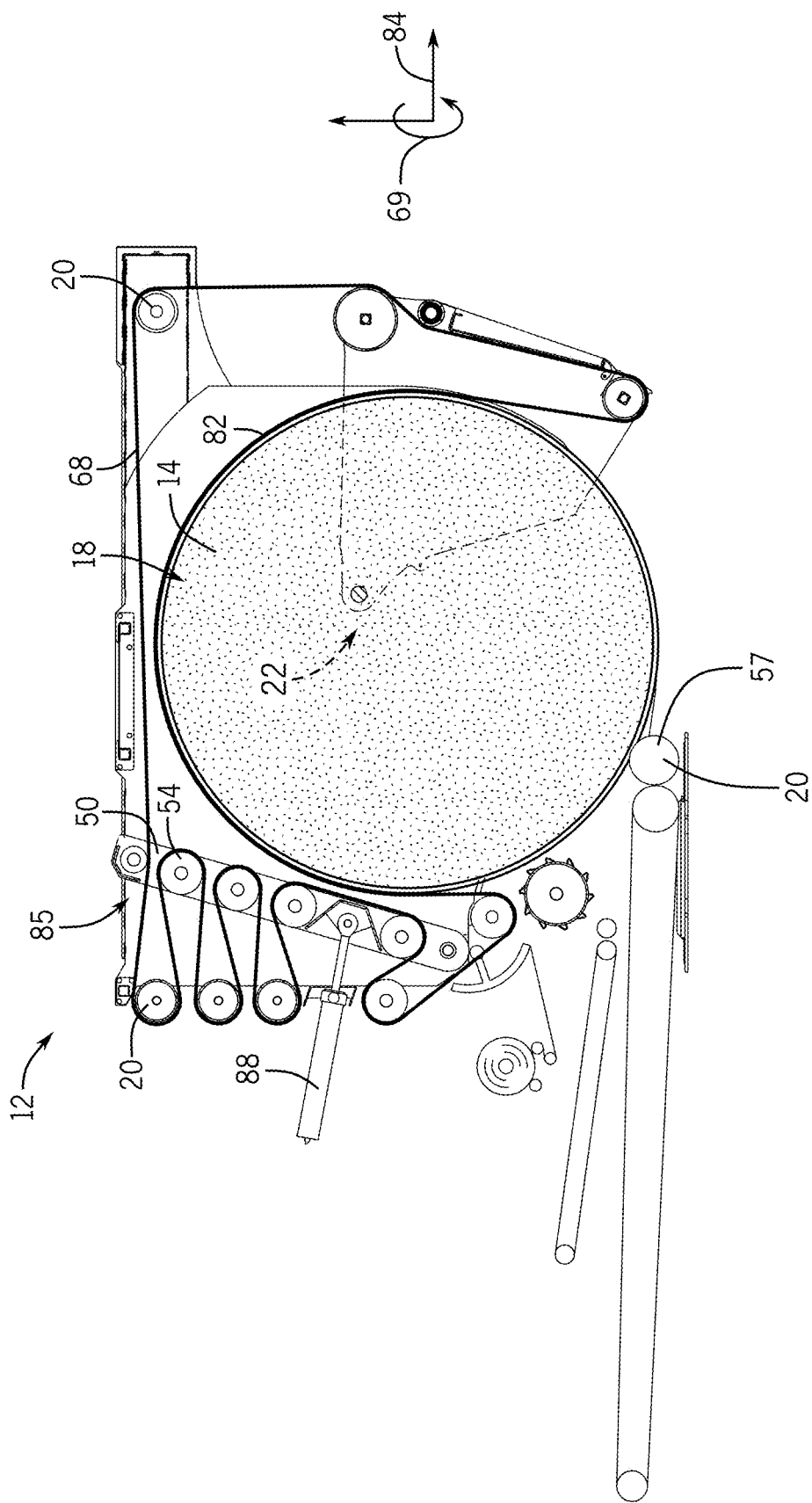
FIG. 7 is a side schematic view of the baling system of FIG. 2, in which a pendulum arm is rotated to a first intermediate position.

FIG. 7 is a side schematic view of the baling system 12 of FIG. 2, in which the pendulum arm 22 is rotated to a first intermediate position. In the illustrated embodiment, the pendulum arm 22 is rotated in the circumferential direction 69 (e.g., counter-clockwise) about the wrapped and fully-formed bale 14. As the pendulum arm 22 rotates in the counter-clockwise direction, the tensioning arm 50 concurrently or subsequently rotates opposite the circumferential direction 69 (e.g., clockwise) and maintains some level of tension of the bale forming belt 68 engaging the bale perimeter 82. The tension in the bale forming belt 68 is due to the tensioning arm 50 rotating based on the forces generated by the actuators 88. The rotation of the pendulum arm 22 and concurrent/subsequent rotation of the tensioning arm 50 results in a shifting (e.g., redistribution) of the bale forming belt 68 from the perimeter 82 of the fully-formed bale 14 to the serpentine portion 85 of the bale forming belt 68 disposed between the main rollers 20 and 54.

In the illustrated embodiment, the fully-formed bale 14 is shifted in the lateral direction 84 due to a force applied to the fully-formed bale 14 by the bale forming belt 68 (e.g., due to the shifting of the bale forming belt from the perimeter of the bale to the serpentine portion) and by assistance from gravity. As shown, the fully-formed bale 14 begins to rotate about (e.g., pivot about) the bottom main roller 57.

Figure 8:
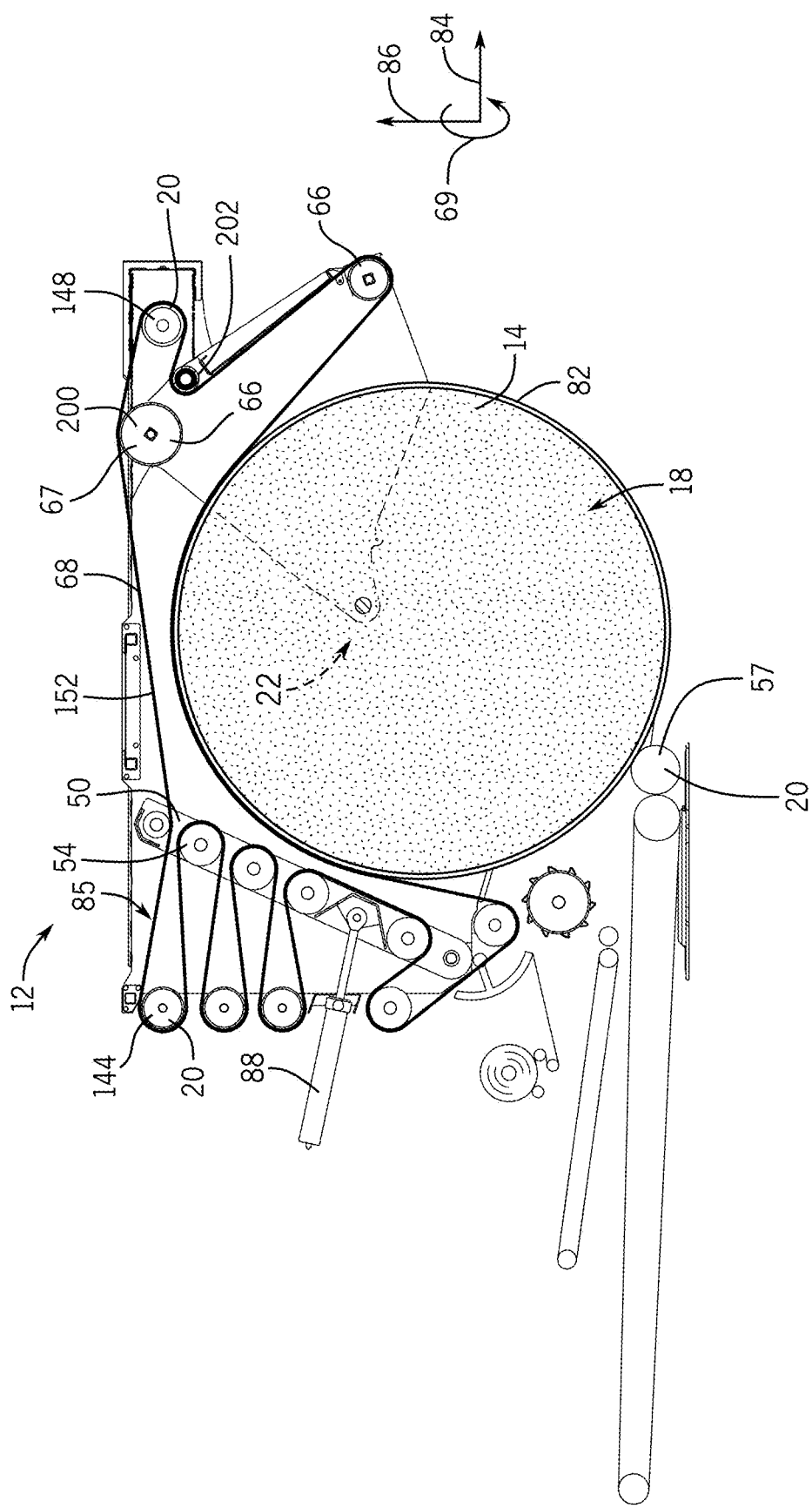
FIG. 8 is a side schematic view of the baling system of FIG. 2, in which the pendulum arm is rotated to a second intermediate position.

FIG. 8 is a side schematic view of an embodiment of the baling system 12 of FIG. 2, in which the pendulum arm 22 is rotated to a second intermediate position. In the illustrated embodiment, the pendulum arm 22 is further rotated in the circumferential direction 69 (e.g., counter-clockwise) about the wrapped and fully-formed bale 14. As the pendulum arm 22 further rotates in the counter-clockwise direction, the tensioning arm 50 concurrently/subsequently further rotates in the clockwise direction. The further rotation of the pendulum arm 22 and the further rotation of the tensioning arm 50 results in a shifting (e.g., redistribution) of the bale forming belt 68 from the perimeter 82 of the fully-formed bale 14 to the serpentine portion 85 of the bale forming belt 68 disposed between the main rollers 20 and 54. A minimum distance between the tension arm 50 and the wrapped and fully formed 14 is maintained such that the force applied by the actuators 88 onto the tension arm 50 will result in uninterrupted control of the desired tension level of the bale forming belt 68 at all stages of bale forming, bale wrapping and ejection of the wrapped and fully-formed bale 14.

In the illustrated embodiment, the fully-formed bale 14 is shifted in the lateral direction 84 due to a force applied to the fully-formed bale 14 by the bale forming belt 68 (e.g., due to the shifting of the bale forming belt from the perimeter of the bale to the serpentine portion) and by assistance from gravity. Additionally, in the illustrated embodiment, the fully-formed bale 14 translates opposite the vertical direction 86 as the bale 14 continues to rotate about the bottom main roller 57 and is ejected from the bale forming region 18.

In the illustrated embodiment, at least a portion of a third roller 200 (e.g., third roller 67) of the pendulum arm rollers 66 coupled to the pendulum arm 22 exceeds a height of a line connecting the tops of the rollers 144 and 148, thereby deflecting a portion of the section 152 of the bale forming belt 68 upwardly. In response to the rotation of the pendulum arm 22, the bale forming belt 68 disengages from the third roller 200, and the third roller 200 subsequently makes tangential contact with the section 152 of the bale forming belt 68. As shown, a diameter of the third roller 200 is larger diameter than the diameter of a second roller 202 of the pendulum arm rollers 66. The larger diameter of the third roller 200 (e.g., third roller 67) enables the pendulum arm 22 (e.g., tailgate) to raise an extra amount to clear the fully-formed bale 14 being ejected without causing contact between the bale forming belt 68 moving in opposite directions.

Figure 9:
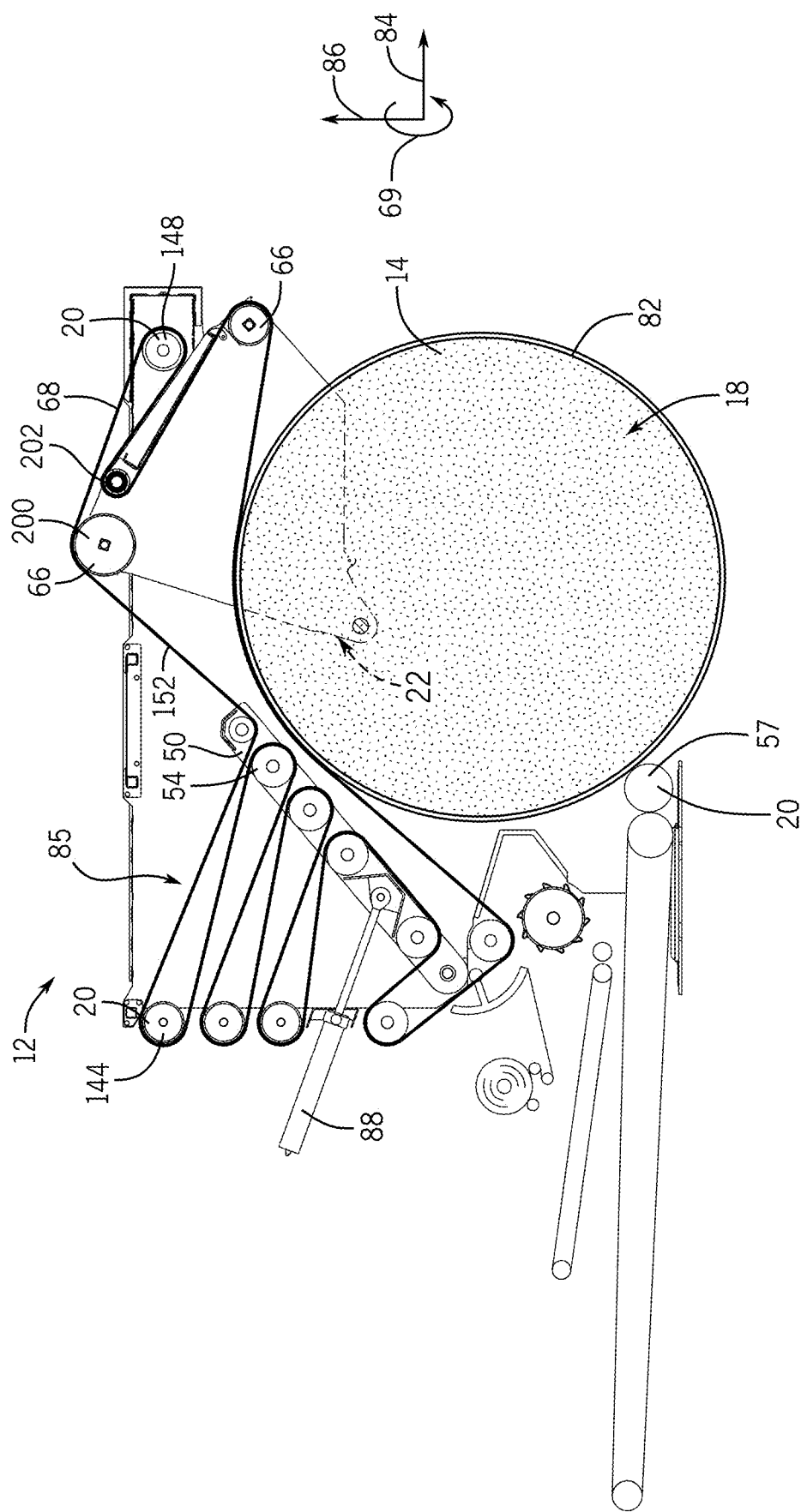
FIG. 9 is a side schematic view of the baling system of FIG. 2, in which the pendulum arm is rotated to an ejection position.

FIG. 9 is a side schematic view of an embodiment of the baling system 12 of FIG. 2, in which the pendulum arm 22 is rotated to an ejection position. In the illustrated embodiment, the pendulum arm 22 is further rotated in the circumferential direction 69 (e.g., counter-clockwise) about the wrapped and fully-formed bale 14. As the pendulum arm 22 further rotates in the counter-clockwise direction, the tensioning arm 50 concurrently/subsequently further rotates in the clockwise direction. The further rotation of the pendulum arm 22 and the further rotation of the tensioning arm 50 results in a shifting (e.g., redistribution) of the bale forming belt 68 from the perimeter 82 of the fully-formed bale 14 to the serpentine portion 85 of the bale forming belt 68 disposed between the main rollers 20 and 54. A minimum distance between the tension arm 50 and the wrapped and fully formed 14 is maintained such that the force applied by the actuators 88 onto the tension arm 50 will result in uninterrupted control of the desired tension level of the bale forming belt 68 at all stages of bale forming, bale wrapping and ejection of the wrapped and fully-formed bale 14.

In the illustrated embodiment, the fully-formed bale 14 is further shifted in the lateral direction 84 due to a force applied to the fully-formed bale 14 by the bale forming belt 68 (e.g., due to the tension in the bale forming belt 68) and with the assistance from gravity. Additionally, in the illustrated embodiment, the fully-formed bale 14 translates opposite the vertical direction 86 as the bale 14 continues to rotate about the bottom main roller 57 and is ejected from the bale forming region 18.

In the illustrated embodiment, the pendulum arm rollers 66 exceeds a height of a line connecting the tops of the rollers 144 and 148, thereby deflecting a portion of the section 152 of the bale forming belt 68 upwardly. In response to the rotation of the pendulum arm 22, the bale forming belt 68 continues to wrap around the second roller 202. As shown, a diameter of the third roller 200 is larger diameter than the diameter of a second roller 202 of the pendulum arm rollers 66 to prevent rubbing between two sections of the bale forming belt 68 near a location of the second roller 202.

Figure 10:
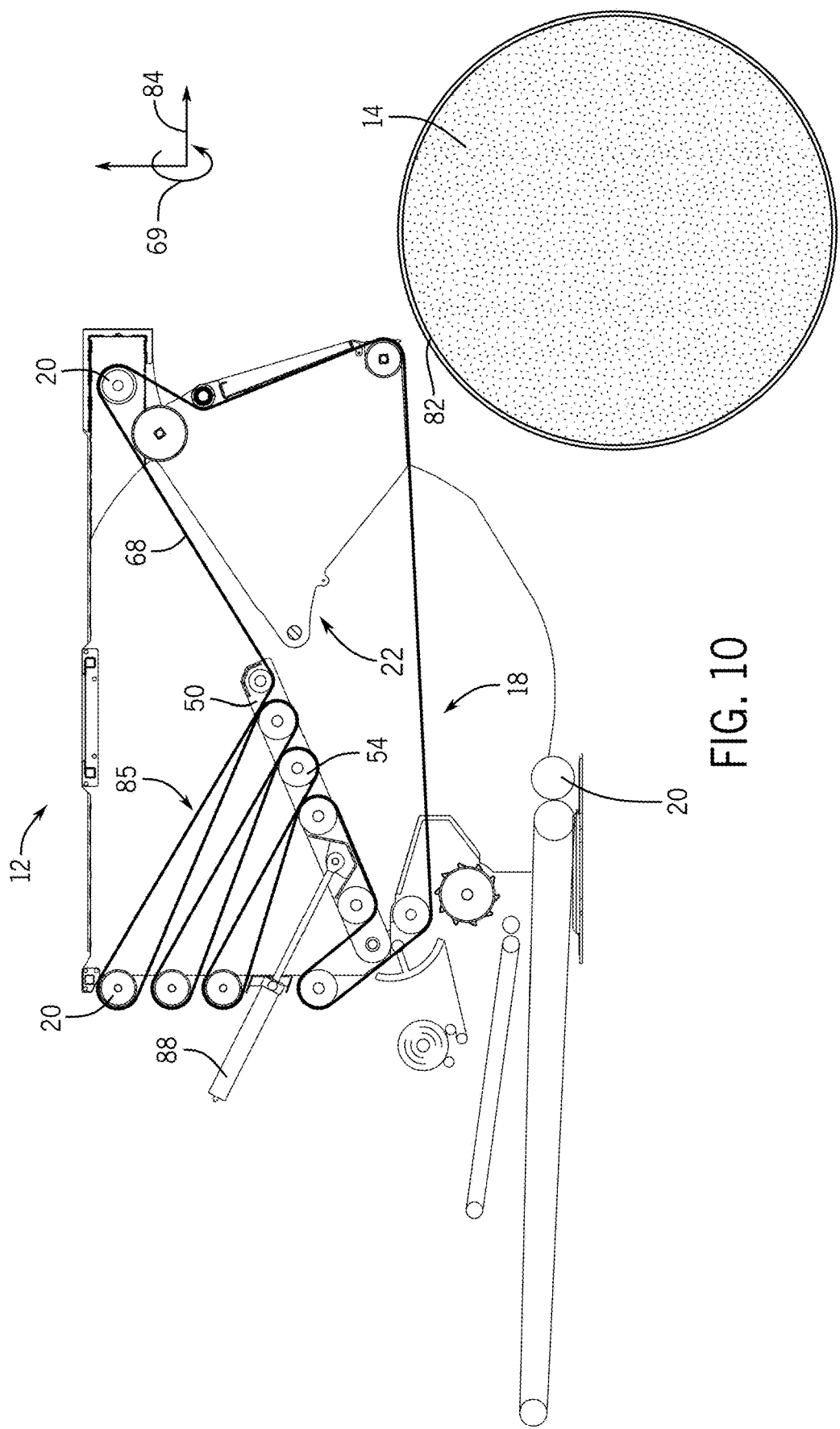
FIG. 10 is a side schematic view of the baling system of FIG. 2, in which the bale is ejected from the baling system.

FIG. 10 is a side schematic view of the baling system 12 of FIG. 2, in which the bale 14 is ejected from the baling system 12. As shown in the illustrated embodiment, the fully-formed bale 14 is ejected from the bale forming region 18 and, in certain embodiments, the baling system 12. As shown, after ejection, the pendulum arm 22 rotates opposite the circumferential direction 69 (e.g., clockwise direction), and the tensioning arm 50 concurrently/subsequently rotates in the clockwise direction so as to maintain a desired amount of tension in the bale forming belt 68 through an applied force from actuators 88 acting on the tension arm 50. In the illustrated embodiment, the ejection of the fully-formed bale 14 from the bale forming region 18 enables a portion of the bale forming belt 68 that were previously disposed about the perimeter 82 of the fully-formed bale 14 to be distributed to the serpentine portion 85 of the bale forming belt 68 disposed between the main rollers 20 and the tensioning arm rollers 54.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform) ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. An agricultural machine system comprising:
a baling system comprising:
a bale forming region;
a tensioning arm rotatably coupled to a frame of the baling system at a pivot;
a first plurality of rollers disposed about the bale forming region;
a second plurality of rollers rotatably coupled to the tensioning arm; and
a bale forming belt disposed about the bale forming region, wherein the bale forming belt is engaged with the first plurality of rollers and the second plurality of rollers;
wherein a rotational axis of the pivot is positioned below a longitudinal central axis of a fully-formed bale disposed in the bale forming region at an end of a bale forming stage; and
wherein at least a portion of each roller of the first plurality of rollers is disposed below a height of the fully-formed bale at the end of the bale forming stage.

2. The agricultural machine system of claim 1, wherein the baling system comprises a feeding system and a bale wrapping system, wherein the feeding system and the bale wrapping system are disposed in front of the bale forming region and below the height of the fully-formed bale.

3. The agricultural machine system of claim 2, wherein the bale wrapping system is configured to wrap the fully-formed bale while the fully-formed bale is rotating in a direction that causes a top portion of the fully-formed bale to move toward a front side of the bale forming region.

4. The agricultural machine system of claim 1, wherein the baling system comprises a pendulum arm configured to:
unwrap a portion of the bale forming belt from a perimeter of the fully-formed bale via rotation of the pendulum arm about the fully-formed bale; and
facilitate ejection of the fully-formed bale from the bale forming region in response to the rotation.

5. The agricultural machine system of claim 1, comprising one or more actuators directly coupled to the tensioning arm, the one or more actuators configured to drive the tensioning arm to rotate about the pivot, wherein the pivot is disposed in front of the bale forming region.

6. The agricultural machine system of claim 1, wherein the first plurality of rollers comprises:
a first roller disposed partially above the height of the fully-formed bale at a first height and in front of the bale forming region; and
a second roller disposed partially above the height of the fully-formed bale at a second height and behind the bale forming region;
wherein the first and second heights are equal.

7. The agricultural machine system of claim 6, wherein a section of the bale forming belt extends from the first roller to the second roller, the section of the bale forming belt comprises a straight path of the bale forming belt, and the section of the bale forming belt is disposed above the height of the fully-formed bale.

8. The agricultural machine system of claim 7, wherein the first plurality of rollers is configured to be disposed below the section of the bale forming belt at the end of the bale forming stage.

9. The agricultural machine system of claim 7, wherein ends of the section of the bale forming belt extend past ends of a longitudinal extent of the fully-formed bale.

10. The agricultural machine system of claim 1, wherein the tensioning arm is configured to rotate from a first angle at a beginning of the bale forming stage to a second angle at the end of the bale forming stage.

11. The agricultural machine system of claim 10, wherein the first and second angles fall within first and second angle windows, respectively, the first angle window spans plus or minus 20 degrees relative to a 40-degree angle from a longitudinal axis, and the second angle window spans from 45 degrees to 90 degrees relative to the longitudinal axis.

12. An agricultural machine system comprising:
a baling system comprising:
a bale forming region;
a tensioning arm rotatably coupled to a frame of the baling system at a pivot;
a first plurality of rollers disposed about the bale forming region comprising first and second rollers;
a second plurality of rollers rotatably coupled to the tensioning arm; and
a bale forming belt disposed about the bale forming region, wherein the bale forming belt is engaged with the first plurality of rollers and the second plurality of rollers;
wherein the bale forming belt comprises a horizontal portion, the horizontal portion extending from the first roller to the second roller;
wherein a rotational axis of the pivot is positioned below a longitudinal central axis of a fully-formed bale disposed in the bale forming region at an end of a bale forming stage;
wherein at least a portion of each roller of the first plurality of rollers is disposed below a height of the fully-formed bale at the end of the bale forming stage;
wherein the first plurality of rollers is disposed below the horizontal portion of the bale forming belt, the horizontal portion disposed above the fully-formed bale at the end of the bale forming stage;
wherein the horizontal portion of the bale forming belt extends past a longitudinal extent of the fully-formed bale at the end of the bale forming stage;
wherein the first and second rollers are disposed at least partially above the height of the fully-formed bale.

13. The agricultural machine system of claim 12, comprising one or more actuators directly coupled to the tensioning arm, the one or more actuators configured to drive the tensioning arm to rotate about the pivot, wherein the pivot is disposed in front of the bale forming region.

14. The agricultural machine system of claim 12, wherein the horizontal portion of the bale forming belt is configured to be disposed above the height of the fully-formed bale by a gap, wherein a width of the gap does not exceed 10 percent of a diameter of the fully-formed bale.

15. The agricultural machine system of claim 14, wherein the width of the gap does not exceed a larger of first and second diameters of the first and second rollers, respectively.

16. An agricultural machine system comprising:
a baling system comprising:
a bale forming region;
a tensioning arm rotatably coupled to a frame of the baling system at a pivot;

a pendulum arm coupled to the bale forming region;
a first plurality of rollers disposed about the bale forming region;
a second plurality of rollers rotatably coupled to the tensioning arm;
a third plurality of rollers rotatably coupled to the pendulum arm; and
a bale forming belt disposed about a perimeter of the bale forming region, wherein the bale forming belt is engaged with the first plurality of rollers, the second plurality of rollers, and the third plurality of rollers;
wherein a rotational axis of the pivot is positioned below a longitudinal central axis of a fully-formed bale disposed in the bale forming region at an end of a bale forming stage;
wherein at least a portion of each roller of the first plurality of rollers is disposed below a height of the fully-formed bale at the end of the bale forming stage;
wherein a radial inlet to the bale forming region is disposed in a bottom left quadrant of the bale forming region;
wherein the pendulum arm is configured to facilitate ejection of the fully-formed bale from the bale forming region via a first rotation of the pendulum arm about the fully-formed bale.

17. The agricultural machine system of claim 16, comprising a bale wrapping system configured to wrap the fully-formed bale while the fully-formed bale is rotating in a direction that causes a top portion of the fully-formed bale to move toward a front side of the baling system.

18. The agricultural machine system of claim 16, wherein a rear diameter of a rear roller of the third plurality of rollers is larger than remaining diameters of remaining rollers of the third plurality of rollers.

19. The agricultural machine system of claim 16, wherein the first plurality of rollers comprises:
a first roller disposed partially above the height of the fully-formed bale at a first height and in front of the bale forming region; and
a second roller disposed partially above the height of the fully-formed bale at a second height and behind the bale forming region;
wherein the first and second heights are equal;
wherein a portion of the bale forming belt is disposed between the first and second rollers forms a straight path of the bale forming belt.

20. The agricultural machine system of claim 19, wherein the first plurality of rollers is disposed below the portion of the bale forming belt during at the end of the bale forming stage.

* * * * *